(12) United States Patent
Li

(10) Patent No.: US 11,367,950 B2
(45) Date of Patent: Jun. 21, 2022

(54) ANTENNA CONTROL SYSTEM, METHOD AND MOBILE TERMINAL

(71) Applicant: VIVO MOBILE COMMUNICATION CO., LTD., Guangdong (CN)

(72) Inventor: Rihui Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 150 days.

(21) Appl. No.: 16/499,613

(22) PCT Filed: Mar. 30, 2018

(86) PCT No.: PCT/CN2018/081334
§ 371 (c)(1),
(2) Date: Sep. 30, 2019

(87) PCT Pub. No.: WO2018/177412
PCT Pub. Date: Oct. 4, 2018

(65) Prior Publication Data
US 2020/0044330 A1 Feb. 6, 2020

(30) Foreign Application Priority Data

Mar. 31, 2017 (CN) .......................... 201710209662.3

(51) Int. Cl.
*H01Q 1/52* (2006.01)
*H01Q 1/24* (2006.01)
*H01Q 5/10* (2015.01)

(52) U.S. Cl.
CPC ............ *H01Q 1/523* (2013.01); *H01Q 1/243* (2013.01); *H01Q 5/10* (2015.01)

(58) Field of Classification Search
CPC ........... H01Q 1/523; H01Q 5/10; H01Q 1/243
See application file for complete search history.

(56) References Cited

U.S. PATENT DOCUMENTS 7,990,319 B2 * 8/2011 Boyle .................... H01Q 5/40
343/893
9,369,187 B1 6/2016 Sammeta et al.
(Continued)

FOREIGN PATENT DOCUMENTS

CN 201616502 U 10/2010
CN 102623791 A 8/2012
(Continued)

OTHER PUBLICATIONS

European Search Report in Application No. 18777189.4 dated Feb. 6, 2020.
(Continued)

*Primary Examiner* — Graham P Smith
*Assistant Examiner* — Jae K Kim
(74) *Attorney, Agent, or Firm* — Maschoff Brennan

(57) ABSTRACT

An antenna control system and method and a mobile terminal are provided. The system includes an antenna and a controller. The antenna includes a first antenna portion and a second antenna portion symmetrically distributed, each of which has a plurality of operating states corresponding to a plurality of operating resonance frequencies. The controller includes an antenna-operating-state acquisition submodule configured to acquire a first operating state of the first antenna portion; a control submodule configured to adjust a second operating state of the second antenna portion based on the first operating state such that a difference between an operating resonance frequency of the first antenna portion and an operating resonance frequency of the second antenna portion is less than a defined threshold.

12 Claims, 6 Drawing Sheets

(56) References Cited

U.S. PATENT DOCUMENTS

| | | | | |
|---|---|---|---|---|
| 2006/0044187 A1* | 3/2006 | Sager | ........... | H01Q 19/005 343/700 MS |
| 2013/0307731 A1* | 11/2013 | Vanjani | ........... | H01Q 1/38 343/700 MS |
| 2013/0328737 A1 | 12/2013 | Ayatollahi et al. | | |
| 2014/0015719 A1* | 1/2014 | Ramachandran | ...... | H01Q 1/243 343/745 |
| 2014/0132465 A1* | 5/2014 | Sanchez | ........... | H01Q 21/28 343/745 |
| 2015/0057054 A1 | 9/2015 | Su et al. | | |
| 2015/0340769 A1* | 11/2015 | Desclos | ........... | H01Q 21/30 343/745 |
| 2017/0062938 A1* | 3/2017 | Cheng | ........... | H01Q 1/243 |
| 2019/0067815 A1* | 2/2019 | Wu | ........... | H01Q 5/35 |
| 2020/0044315 A1* | 2/2020 | Gu | ........... | H01Q 21/28 |
| 2020/0328501 A1* | 10/2020 | Kang | ........... | H01Q 1/243 |

FOREIGN PATENT DOCUMENTS

| | | | | |
|---|---|---|---|---|
| CN | 203466294 U | | 3/2014 | |
| CN | 103915675 A | | 7/2014 | |
| CN | 104022354 A | | 9/2014 | |
| CN | 203984424 U | | 12/2014 | |
| CN | 104577340 A | | 4/2015 | |
| CN | 105656509 A | | 6/2016 | |
| CN | 105826652 A | * | 8/2016 | |
| CN | 105826652 A | | 8/2016 | |
| CN | 105826654 A | | 8/2016 | |
| CN | 105826685 A | | 8/2016 | |
| CN | 106033840 A | | 10/2016 | |
| CN | 106252888 A | | 12/2016 | |
| CN | 106921041 A | | 7/2017 | |
| KR | 20130077362 A | * | 7/2013 | ............... H01Q 9/42 |

OTHER PUBLICATIONS

Mak et al., "Isolation Enhancement Between Two Closely Packed Antennas", IEEE Transactions on Antennas and Propagation, vol. 56, No. 11, Nov. 2008.

CN Office Action in Application No. 201710209662.3 dated Apr. 22, 2019.

Written Opinion and International Search Report in Application No. PCT/CN2018/081334 dated Oct. 10, 2019.

* cited by examiner

ANTENNA CONTROL SYSTEM, METHOD AND MOBILE TERMINAL

CROSS-REFERENCE TO RELATED APPLICATION

This application is a U.S. national phase application of a PCT Application No. PCT/CN2018/081334 filed on Mar. 30, 2018, which claims priority to a Chinese Patent Application No. 201710209662.3 filed in China on Mar. 31, 2017, the disclosure of which is incorporated herein by reference in its entirety.

TECHNICAL FIELD

The present disclosure relates to the field of communication, and in particular, relates to an antenna control system, an antenna control method, and a mobile terminal.

BACKGROUND

Referring to FIG. 1, antenna technologies currently used for a mobile terminal commonly use a monopole antenna, an inverted F-shaped antenna (IFA), a loop antenna (LOOP), and so on. An antenna feed is usually placed at a left corner or a right corner of the mobile terminal, which is a design mode of a single-resonant-arm antenna. However, because the single-resonant-arm antenna resonates at a single branch at a left side or at a right side, energy of the antenna concentrates excessively on the branch, incurring that electric field intensities at a left side and a right side of the mobile terminal vary greatly. Moreover, an absorption loss of the branch of the antenna beside the head and the hand of a user may be increased significantly, resulting in a significant difference in performance of the branch beside the head or the hand and performance of a branch away from the head or the hand.

In relate art, an improved scheme is proposed for a conventional antenna scheme. In this improved scheme, an antenna of a mobile terminal has two antenna branches distributed at both sides of the mobile terminal, and a certain antenna branch is actively short-circuited through a switch, that is, a position of an end of the antenna is changed so that the energy of the antenna is concentrated at the other antenna branch to improve left and right head-hand performances. However, the above improved scheme needs to perform a targeted switching between a left antenna and a right antenna based on an actual usage scene of the mobile terminal, such as a scene of left head-hand or a scene of right head-hand, that is, detection or judgment of the usage scene needs to be performed. Therefore, there is a problem that the switching between the left antenna and the right antenna is insensitive or poorly adapted to a scene.

SUMMARY

Embodiments of the present disclosure provide an antenna control system, an antenna control method, and a mobile terminal so as to address or partially address the problem that switching between left and right antennas of a mobile terminal for purpose of improving left and right head-hand performances of an antenna of the mobile terminal is insensitive or poorly adapted to different usage scenes.

In a first aspect, some embodiments of the present disclosure provide an antenna control system. The system includes an antenna and a controller; wherein the antenna includes a first antenna portion and a second antenna portion symmetrically distributed; each of the first antenna portion and the second antenna portion has a plurality of operating states corresponding to a plurality of operating resonance frequencies. The controller includes an antenna-operating-state acquisition submodule and a control submodule, the antenna-operating-state acquisition submodule is configured to acquire a first operating state of the first antenna portion; the control submodule is configured to adjust a second operating state of the second antenna portion based on the first operating state such that a difference between an operating resonance frequency of the first antenna portion and an operating resonance frequency of the second antenna portion is less than a defined threshold.

In another aspect, some embodiments of the present disclosure provide a method of controlling an antenna. The antenna includes a first antenna portion and a second antenna portion symmetrically distributed, each of the first antenna portion and the second antenna portion has a plurality of operating states corresponding to a plurality of operating resonance frequencies. The method includes acquiring a first operating state of the first antenna portion; adjusting a second operating state of the second antenna portion based on the first operating state such that difference between an operating resonance frequency of the first antenna portion and an operating resonance frequency of the second antenna portion is less than a defined threshold.

In still another aspect, some embodiments of the present disclosure provide a mobile terminal. The mobile terminal includes the antenna control system according to the first aspect.

In this way, in some embodiments of the present disclosure, antenna energy is more uniformly distributed at both sides of an antenna by enabling the symmetrically distributed first antenna portion and the second antenna portion to simultaneously operate and have operating resonance frequencies close to or equal to each other, without needing switching between left and right antennas according to an actual usage scene of the mobile terminal, thereby avoiding the problem that the switching between left and right antennas of the mobile terminal for purpose of improving left and right head-hand performances of the antenna of the mobile terminal is insensitive or poorly adapted to different usage scenes, and a technical effect of balancing the left and right head-hand performances of the antenna is achieved.

BRIEF DESCRIPTION OF THE DRAWINGS

In order to more clearly illustrate technical solutions of the embodiments of the present disclosure, accompanying drawings to be used in description of the embodiments of the present disclosure will be briefly described below. It is apparent that the accompanying drawings in the following description are only illustrative of some embodiments of the present disclosure. For those of ordinary skills in the art, other drawings may also be obtained from these drawings without paying any creative labor.

DETAILED DESCRIPTION

The technical solutions in the embodiments of the present disclosure will be clearly and completely described in conjunction with the accompanying drawings in the embodiments of the present disclosure hereinafter. I will be apparent that the described embodiments are a part, rather than all of the embodiments of the present disclosure. Based on the embodiments of the present disclosure, all other embodiments obtained by those of ordinary skills in the art without creative work are within the scope of the present disclosure.

Through a large number of practices, the inventors of the present disclosure find that when two antenna branches having the same or adjacent operating resonance frequency are distributed at left and right sides of a mobile terminal, the two antenna branches may efficiently disperse antenna energy, and electric field strengths at the left and right sides are more uniform, and left and right head-hand performances of a user may be more balanced. Thus, one of key concepts of the embodiments of the present disclosure is that a first antenna portion and a second antenna portion symmetrically distributed at the left and right sides of the mobile terminal simultaneously operate, and operating resonance frequencies of the first antenna portion and the second antenna portion are close or equal, so that the antenna energy is more uniformly distributed at the left and right sides of the mobile terminal, without needing to switch left and right antennas based on the actual usage scene of the mobile terminal.

Figure 1:
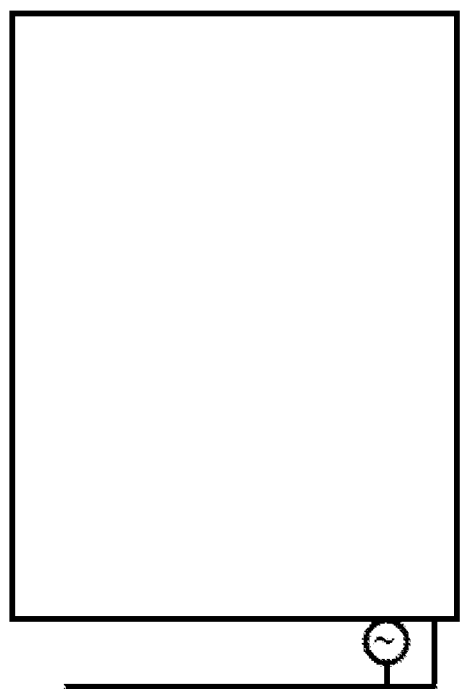
FIG. 1 is a schematic diagram of a conventional inverted F-shaped antenna of a mobile terminal.
Figure 2:
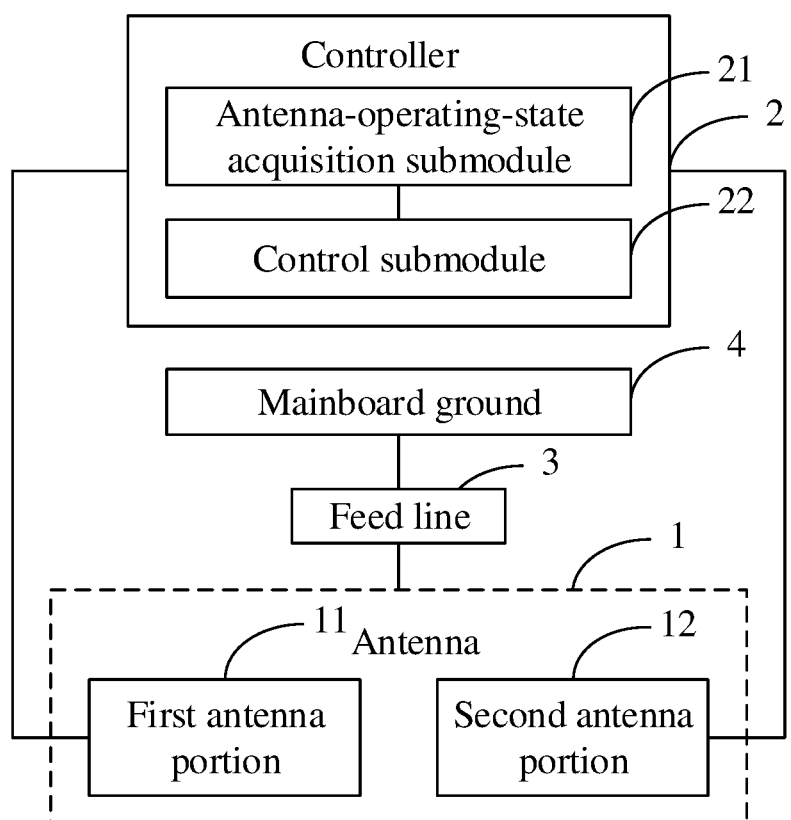
FIG. 2 is a schematic structural diagram of an antenna control system in some embodiments of the present disclosure.

Referring to FIG. 2, a schematic structural diagram of an antenna control system based on the embodiments of the present disclosure is shown. The antenna control system may specifically include an antenna 1 and a controller 2. The antenna 1 may specifically include a first antenna portion 11 and a second antenna portion 12 symmetrically distributed. Each of the first antenna portion 11 and the second antenna portion 12 has a plurality of operating states corresponding to a plurality of operating resonance frequencies. The controller 2 may specifically include an antenna-operating-state acquisition submodule 21 and a control submodule 22. The antenna-operating-state acquisition submodule 21 is configured to acquire a first operating state of the first antenna portion 11. The control submodule 22 is configured to adjust a second operating state of the second antenna portion 12 based on the first operating state, so that a difference between an operating resonance frequency of the first antenna portion 11 and an operating resonance frequency of the second antenna portion 12 is smaller than a defined threshold.

In practical application, referring to FIG. 2, the antenna 1 is connected to a feed line 3 and receives a radio frequency signal from the feed line 3. The first antenna portion 11 and the second antenna portion 12 are also connected to a mainboard ground 4. Generally, the feed line 3 is formed by an antenna feed and an antenna matching circuit connected in series, and the antenna matching circuit is used to enable a radio frequency signal from the antenna feed to match different operating resonance frequencies of the antenna. Thus, the radio frequency signal from the feed line 3 may be transmitted through the first antenna portion 11 and the second antenna portion 12. Likewise, a signal may be received through the first antenna portion 11 and the second antenna portion 12.

In an embodiment applied to the mobile terminal, the first antenna portion 11 and the second antenna portion 12 may be symmetrically distributed at the left and right sides of the mobile terminal. For example, the first antenna portion 11 is arranged on the left side of the mobile terminal, the second antenna portion 12 is arranged at a corresponding right side of the mobile terminal symmetrical to the left side, and vice versa. It may be understood that the above symmetry does not mean absolute symmetry in a mathematical sense, but merely represents a relative position relation and does not require strict symmetry.

The controller 2 may be connected to the first antenna portion 11 and the second antenna portion 12, respectively, or may be connected by way of signals. The antenna-operating-state acquisition submodule 21 of the controller 2 may acquire an operating state and a corresponding operating resonance frequency of the first antenna portion 11 or the second antenna portion 12 by signal transmission. For example, a signal at the time of transitioning the operating state may be acquired, a signal in the operating state may be acquired, or the like. The control submodule 22 may adjust a second operating state of the second antenna portion 12 based on the first operating state, such that the difference between the operating resonance frequency of the first antenna portion 11 and the operating resonance frequency of the second antenna portion 12 is smaller than the defined threshold. The antenna-operating-state acquisition submodule 21 may further acquire the second operating state of the second antenna portion 12; in a case that the second operating state corresponds to the first operating state, that is, the difference between a current operating resonance frequency of the second antenna portion 12 and a current operating resonance frequency of the first antenna portion 11 is smaller than the defined threshold, the control submodule may not switch the operating state of the second antenna portion 12.

It may be understood that adjustment of the first operating state or the second operating state may be performed in a variety of ways to change the operating resonance frequency of the first antenna portion 11 or the second antenna portion 12. For example, a corresponding operating resonance frequency may be adjusted by adjusting an antenna length of the first antenna portion 11 or the second antenna portion 12, that is, by adjusting respective lengths of corresponding resonant arms. The corresponding operating resonance frequency may also be adjusted by adjusting a connection of the first antenna portion 11 or the second antenna portion 12 to the feed line, such as adjusting the connection as a direct connection or an aperture coupling connection or the like. The corresponding operating resonance frequency may also be adjusted by adjusting a connection of the first antenna portion 11 or the second antenna portion 12 to the mainboard ground, such as adjusting the connection as an open circuit, a connected circuit, an aperture coupling, a connection through different circuit elements, etc. In summary, embodiments of that present disclosure are not limited thereto.

In addition, the difference between the operating resonance frequency of the first antenna portion 11 and the operating resonance frequency of the second antenna portion 12 is smaller than a defined threshold. A limitation of the different is to ensure the operating resonance frequency of the first antenna portion 11 and the operating resonance frequency of the second antenna portion 12 to be close or equal, so that the antenna energy may be more uniformly distributed between the two antenna portions. The closer the operating resonance frequencies are, the more uniform the distribution is. Therefore, other limiting means may be adopted, for example, the operating resonance frequency f1 of the first antenna portion 11 and the operating resonance frequency f2 of the second antenna portion 12 satisfy $0.7f1 \leq f2 \leq 1.3f1$. Any characteristic capable of bringing the operating resonance frequency of the first antenna portion 11 and the operating resonance frequency of the second antenna portion 12 to close to or equal to each other is within the scope of the embodiments of the present disclosure.

It should be noted that a shape of the first antenna portion 11 or the second antenna portion 12 may be flexible, and may be a monopole antenna, an inverted F-shaped antenna, a loop antenna, a Planar Inverted F-shaped antenna (PIFA) or the like, and may be a multi-resonance structure such as a G type or an F type.

In particular, in a mobile terminal having a metal frame provided with a first fracture and a second fracture, a part of the metal frame between that first fracture and the second fracture may be used as the antenna 1; the feed line of the mobile terminal is connected to a middle portion of the part of the metal frame, and the part of the metal frame is connected to the mainboard ground, wherein a first portion of the metal frame between the first fracture and the feed line of the mobile terminal is used as the first antenna portion 11, a second portion of the metal frame between the remaining second fracture and the feed line of the mobile terminal is used as the second antenna portion 12. Similarly, in a mobile terminal having a first metal cover and a second metal cover, the first metal cover may be used as the first antenna 1, a feed line of the mobile terminal is connected to a middle portion of the first metal cover, the second metal cover is connected to the mainboard ground, and a gap is provided between the first metal back cover and the second metal back cover; wherein parts of the first metal cover at the left and right sides of the feed line are used as the first antenna portion 11 and the second antenna portion 12, respectively. Specific embodiments described above are only used for describing the technical solutions of the embodiments of the present disclosure in more detail, and the embodiments of the present disclosure are not limited to the embodiments described above, and are not limited thereto.

In summary, in the embodiments of the present disclosure, the antenna energy is more uniformly distributed at both sides of the antenna by enabling the symmetrically distributed first antenna portion and the second antenna portion to simultaneously operate and by causing the operating resonance frequencies of the first antenna portion and the second antenna portion to be close to or equal to each other. Since the switching between left and right antennas of the mobile terminal do not need to be performed based on actual usage scenes of the mobile terminal, the problem that the switching between the left and right antennas of the mobile terminal for purpose of improving the left and right head-hand performances of the antennas of the mobile terminal are insensitive or poorly adapted to the scenes is addressed, and a technical effect of balancing left-right head-hand functions of the antennas is achieved.

Figure 3:
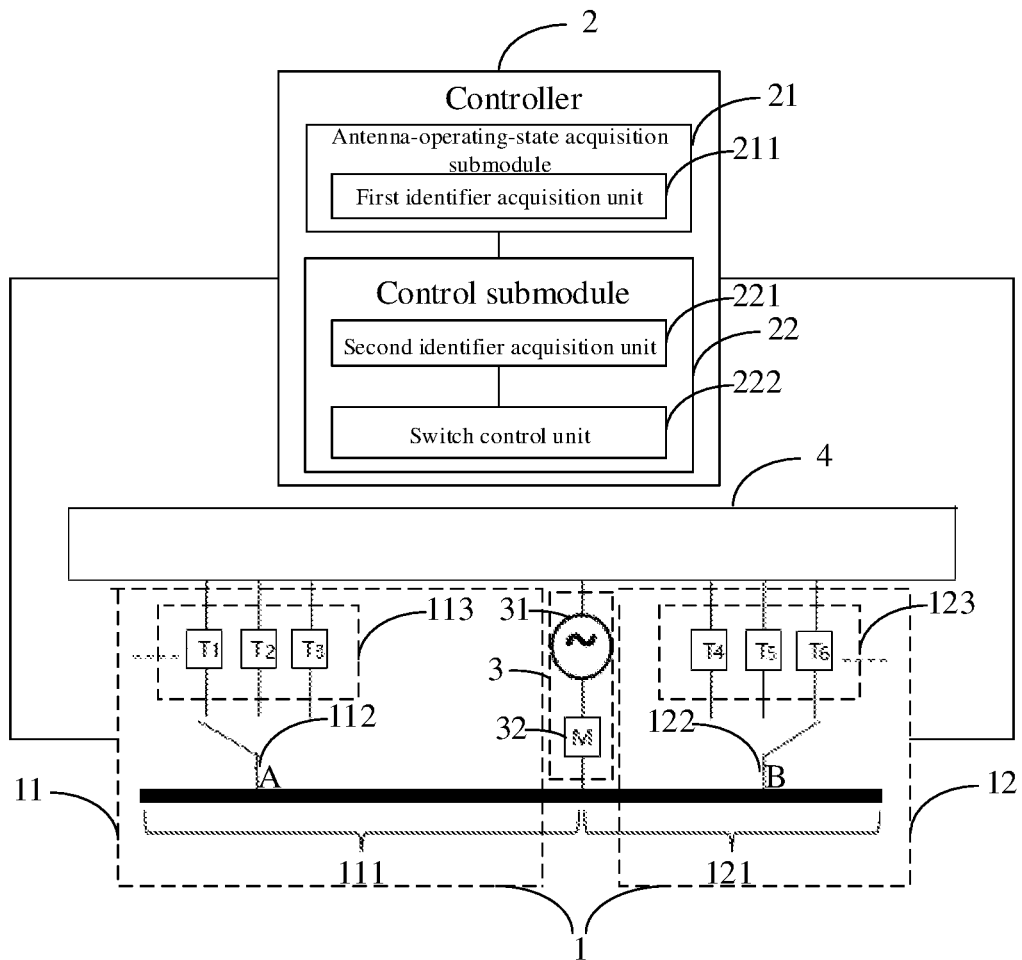
FIG. 3 is a schematic structural diagram of an antenna control system in some embodiments of the present disclosure.

Referring to FIG. 3, FIG. 3 shows a schematic structural diagram of an antenna control system in some embodiments of the present disclosure. The antenna control system may specifically include the antenna 1 and the controller 2.

The antenna 1 may specifically include the first antenna portion 11 and the second antenna portion 12 symmetrically distributed. Each of the first antenna portion 11 and the second antenna portion 12 has a plurality of operating states corresponding to a plurality of operating resonance frequencies. The first antenna portion 11 includes a first antenna 111, a first switch 112, and a first multi-tuning circuit 113 connected in series. The second antenna portion 12 includes a second antenna 121, a second switch 122, and a second multi-tuning circuit 123 connected in series. Each of the first multi-tuning circuit 113 and the second multi-tuning circuit 123 is formed by a plurality of tuning branches connected in parallel. There is a predefined correspondence relation between the plurality of tuning branches of the first multi-tuning circuit 113 and the plurality of tuning branches of the second multi-tuning circuit 123. In a case that any tuning branch of the first multi-tuning circuit 113 is connected with the first switch 112, and a tuning branch of the second multi-tuning circuit 123 having the predefined correspondence relation is connected with the second switch 122, the difference between the operating resonance frequency of the first antenna portion 11 and the operating resonance frequency of the second antenna portion 12 is smaller than the defined threshold. The controller 2 may specifically include the antenna-operating-state acquisition submodule 21 and the control submodule 22. The antenna-operating-state acquisition submodule 21 may specifically include a first identifier acquisition unit 211 configured to acquire a first identifier of a tuning branch connected to the first switch 112 in the first multi-tuning circuit 113. The control submodule 22 may specifically include: a second identifier acquisition unit 221 configured to acquire, based on the first identifier and the predefined correspondence relation, a second identifier of a tuning branch in the second multi-tuning circuit 123 corresponding to the first identifier; and a switch control unit 222 configured to control the second switch 122 to connect with the tuning branch corresponding to the second identifier in the second multi-tuning circuit 123.

In practical application, referring to FIG. 3, the antenna 1 is connected to the feed line 3 and receives a radio frequency signal from the feed line 3. The first antenna portion 11 and the second antenna portion 12 are connected to the mainboard ground 4. Generally, the feed line 3 is formed by the antenna feed 31 and the antenna matching circuit 32 connected in series, and the antenna matching circuit 32 is configured to enable the radio frequency signal from the antenna feed 31 to match different operating resonance frequencies of the antenna.

Referring to FIG. 3, the first multi-tuning circuit 113 includes a first tuning branch T1, a second tuning branch T2, a third tuning branch T3, and the like arranged in parallel. One end of each of the tuning branches is connected to the mainboard ground 4, and the other end of the each of the turning branches is suspended or connected to a switching end of the first switch 112. Similarly, the second multi-tuning circuit 123 includes a fourth tuning branch T4, a fifth tuning branch T5, a sixth tuning branch T6, and the like arranged in parallel. One end of each of the tuning branches is connected to the mainboard ground 4, and the other end of the each of the tuning branches is suspended or connected to a switching end of the second switch 122.

Referring to FIG. 3, in the embodiments of the present disclosure, the first antenna 111 and the second antenna 121 may be considered as two symmetrically distributed resonation arms of the antenna 1, respectively, but the operating resonance frequency of the first antenna 111 is correlated to the first antenna 111, the first switch 112 and the tuning branch of the first multi-tuning circuit 113 in connection with the first switch 112, wherein a length of the first antenna 111, and an electrical characteristics of the tuning branch of the first multi-tuning circuit 113 in connection with the first switch 112 have a large influence on the operating resonance frequency, and specific correlation may be determined experimentally or estimated theoretically. In a case that the length of the first antenna 111 is fixed, at least the first switch 112 may be adjusted to adjust the electrical characteristics of the tuning branch of the corresponding first multi-tuning circuit 113 in connection with the first switch 112. Because electrical characteristics of different tuning branches are different, for example, the electrical characteristics of a tuning branch may be equivalent to an inductance of 5 nH (n is $10^{-9}$ and H is a unit of inductance) or equivalent to an capacitance of 1.2 pF (p is $10^{-12}$, F is a unit of capacitance), and the above adjustment may be equivalent to adjusting an operating state of the first antenna portion 11 and a corresponding operating resonance frequency of the first antenna portion 11. Description of the second antenna portion may be obtained by referring to the description of the first antenna portion described above.

It should be noted that, when the antenna 1 is in operation, the first switch 112 is necessarily connected with one tuning branch of the first multi-tuning circuit 113, and is connected with only one tuning branch of the first multi-tuning circuit 113. Similarly, the second switch 122 is necessarily connected with one tuning branch of the second multi-tuning circuit 123, and is connected with only one tuning branch of the second multi-tuning circuit 123.

Further, there is a predefined correspondence relation between the plurality of tuning branches of the first multi-tuning circuit 113 and the plurality of tuning branches of the second multi-tuning circuit 123. In a case that any tuning branch of the first multi-tuning circuit 113 is in connection with the first switch 112, and a tuning branch of the second multi-tuning circuit 123 having the preset corresponding relation is in connection with the second switch 122, the difference between the operating resonance frequency of the first antenna portion 11 and the operating resonance frequency of the second antenna portion 12 is less than a defined threshold. Then, in some embodiments of the present disclosure, as long as there is the predefined correspondence relation between the tuning branch connected to the first switch 112 and the tuning branch connected to the second switch 122, the difference between the operating resonance frequency of the first antenna portion 11 and the operating resonance frequency of the second antenna portion 12 may be ensured to be less than the defined threshold, by adjusting connection states of the first switch 112 and the second switch 122, respectively, i.e., by adjusting connection states of each of the first switch 112 and the second switch 122 with a tuning branch in the multi-tuning circuit corresponding to the first switch 112 or the second switch 122.

The predefined correspondence relation may be acquired at least by experimental measurement. For example, for the first antenna portion 11 being fixed, at least the length of the first antenna 111 and the electrical characteristics of the tuning branches of the first multi-tuning circuit 113 described above have been fixed. For a tuning branch A of the tuning branches, when the first switch 112 is connected to the tuning branch A, the operating resonance frequency of the first antenna portion 11 is fixed. Assuming that the length of the second antenna 121 has also been fixed, it may be determined by experimental measurement, for example, that the second switch is connected to a tuning branch B of the second multi-tuning circuit 123; if the difference between the operating resonance frequency of the first antenna portion 11 and the operating resonance frequency of the second antenna portion 12 determined by experimental measurement at this time is less than the defined threshold, the tuning branch A of the first multi-tuning circuit 113 and the tuning branch B of the second multi-tuning circuit 123 have the predefined correspondence relation. If the difference between the operating resonance frequency of the first antenna portion 11 and the operating resonance frequency of the second antenna portion 12 determined by experimental measurement at this time is not less than the defined threshold, the electrical characteristic of the tuning branch B is gradually adjusted, such as by increasing or decreasing capacitance, increasing or decreasing inductance, or the like, until the difference between the operating resonance frequency of the first antenna portion 11 and the operating resonance frequency of the second antenna portion 12 determined by experimental measurement is less than the defined threshold. In such a case, the updated tuning branch B acts as a tuning branch of the second multi-tuning circuit 123 being designed, and the tuning branch A of the first multi-tuning circuit 113 and the tuning branch B of the second multi-tuning circuit 123 have the predefined correspondence relation. Thus, there is the preset correspondence relation between the tuning branch of the first multi-tuning circuit 113 and the tuning branch of the second multi-tuning circuit 123 designed as above. Description of the second antenna portion may be obtained by referring to the description of the first antenna portion described above.

In practical application, the predefined correspondence relation may be summarized as a correspondence relation between the tune branch connected to the first switch 112 and the tuning branch connected to the second switch 122, or a connection state of the first switch 112 and a connection state of the second switch 122, or others which actually correspond to the corresponding relation between the connected tuning branches.

In some embodiments of that present disclosure, the length of the first antenna 111 is 50 mm, the first multi-tuning circuit 113 is formed four tuning branches arranged in parallel, the electrical characteristics of the four tuning branch are 82 nH, 18 nH, 5 nH and 2 nH, respectively. The first antenna portion 11 may resonate at LB1 (0.7 GHz to 0.746 GHz), LB2 (0.824 GHz to 0.96 GHz), MB (1.71 GHz to 2.17 GHz), HB (2.3 GHz~2.69 GHz). The length of the second antenna 121 is 35 mm. The second multi-tuning circuit 123 is formed by four tuning branches arranged in parallel, and the electrical characteristics of the four tuning branches are 1.2 pf, 47 nH, 6 nH and 3 nH, respectively. The second antenna portion may resonate at LB1 (0.7 GHz~0.746 GHz), LB2 (0.824 GHz~0.96 GHz), MB (1.71 GHz~2.17 GHz), HB (2.3 GHz~2.69 GHz), wherein LB1 represents a first low frequency band, LB2 represents a second low frequency band, MB represents an intermediate frequency band, HB represents a high frequency band, G is $10^9$, and Hz is a frequency unit. The four tuning branches of the first multi-tuning circuit 113 correspond to the four tuning branches of the second multi-tuning circuit 123 in a one-to-one manner in a sequence of electrical characteristics of the tuning branches, and have the predefined correspondence relation. For example, in a case that the first switch 112 is connected to the tuning branch of the 2 nH in the first multi-tuning circuit 113 and the second switch 122 is connected to the tuning branch of the 3 nH in the second multi-tuning circuit 123, both the operating resonance frequency of the first antenna portion 11 and the operating resonance frequency of the second antenna portion 12 are in the HB (2.3 GHz to 2.69 GHz), that is, the operating resonance frequency of the first antenna portion 11 is close to or equal to the operating resonance frequency of the second antenna portion 12. The specific embodiments described above are only for describing technical solutions of the embodiments of the present disclosure in more detail, and the embodiments of the present disclosure are not limited to the embodiments described above, and are not limited thereto.

In some embodiments of the present disclosure, each of the first switch 112 and the second switch 122 may be a single-pole multiple-throw switch, a single-pole single-throw switch, an electronic switch, a photoelectric switch, or another type of switch, and may be controlled in an open-closed manner, or by a switch driving module, or in other ways.

It should be noted that the first identifier is only used to identify the tuning branch of the first multi-tuning circuit 113 connected with the first switch 112, or identify a connection state of the first switch 112.

In general, in the embodiments of the present disclosure, a driving unit connected to the first switch 112 may receive a connection signal from the driving unit of the first switch 112 when the first switch 112 is driven by the driving unit to be connected to a certain tuning branch. The connection signal may be used as the first identifier of the tuning branch of the first multi-tuning circuit 113 connected with the first switch 112, because which tuning branch is in connection with the first switch 112 may be known based on the connection signal. Of course, the first identifier acquisition unit 211 may also search an identifier of a default tuning branch connected to the first switch 112; if the tuning branch connected to the first switch 112 is changed compared to the default tuning branch, then there must exist an actuation of the first switch 112, and the first identifier acquisition unit 211 may look up a stored identifier of a tuning branch to which the first switch 112 is driven to be connected last time. Description of the second antenna portion may be obtained by referring to the description of the first antenna portion described above.

It may be understood that the predefined correspondence relation is stored in advance, and may be stored in the second identifier acquisition unit 221, or may be stored in other locations, as long as the second identifier acquisition unit 221 may obtain the predefined correspondence relation. Referring to a previous embodiment of the present disclosure, acquisition of the connection signal by the second identifier acquisition unit 221 is equivalent to acquisition of the first identifier by the second identifier acquisition unit 221, and based on the predefined correspondence relation, the second identifier of the tuning branch in the second multi-tuning circuit 123 corresponding to the first identifier may be directly found, which means that it is known which one of the tuning branches in the second multi-tuning circuit 123, the second switch 122 is to connect with; the switch control unit 222 may transmit a switch driving signal to a driving unit of the second switch 122 based on the second identifier, so that the driving unit drives the second switch 122 to connect with the tuning branch in the second multi-tuning circuit 123 corresponding to the second identifier.

Of course, the second identifier acquisition unit 221 may also search the previously stored identifier of the tuning branch with which the second switch 122 is driven to connect last time or an identifier of the default tuning branch to which the second switch 122 is connected with. If the identifier and the first identifier already have the predefined correspondence relation therebetween, the second identifier acquisition unit 221 does not change the connection state of the second switch 122.

In a specific embodiment, referring to FIG. 3, the first antenna 111 is connected to the feed line 3 and has a length of 50 mm the first switch 112 is a single-pole three-throw switch, and the first multi-tuning circuit 113 is connected to the mainboard ground 4. The first multi-tuning circuit 113 is formed by the first tuning branch T1, the second tuning branch T2 and the third tuning branch T3 arranged in parallel. The first tuning branch T1 is formed of an inductance element of 82 nH, the second tuning branch T2 is formed of an inductance element of 18 nH, and the third tuning branch T3 is formed of an inductance element of 5 nH. A switching end of the first switch 112 is connected to the first tuning branch T1, the operating resonance frequency of the first antenna portion 11 is 0.7 GHz~0.746 GHz. When the switching end of the first switch 112 is connected to the second tuning branch, the operating resonance frequency of the first antenna portion 11 is 0.824 GHz~0.96 GHz. When the switching end of the first switch 112 is connected to the third tuning branch, the operating resonance frequency of the first antenna portion 11 is 1.71 GHz~2.17 GHz.

Accordingly, the second antenna 121 is connected to the feed line 3 and has a length of 35 mm, the second switch 122 is a single-pole three-throw switch, and the second multi-tuning circuit 123 is connected to the mainboard ground 4, wherein, the second multi-tuning circuit 123 is formed by the fourth tuning branch T4, the fifth tuning branch T5 and the sixth tuning branch T6 arranged in parallel. The fourth tuning branch T4 is formed of an inductance element of 6 nH, the fifth tuning branch T5 is formed of an inductance element of 47 nH, and the sixth tuning branch T6 is formed of a capacitance element of 1.2 pf. In a case that the switching end of the second switch 122 is connected to the fourth tuning branch T4, the operating resonance frequency of the second antenna portion 12 is 1.71 GHz~2.17 GHz. In a case that the switching end of the second switch 122 is connected to the fifth tuning branch T5, the operating resonance frequency of the second antenna portion 12 is 0.824 GHz~0.96 GHz. In a case that the switching end of the second switch 122 is connected to the sixth tuning branch T6, the operating resonance frequency of the second antenna portion 12 is 0.7 GHz~0.746 GHz.

It may be understood that the first tuning branch T1 and the sixth tuning branch T6 have the above predefined correspondence relation, the second tuning branch T2 and the fifth tuning branch T5 have the above predefined correspondence relation, and the third tuning branch T3 and the fourth tuning branch T4 have the above predefined correspondence relation. In a specific embodiment, the first identifier acquisition unit 211 is connected to the driving unit for the first switch 112, receives a connection signal from the driving unit when the first switch 112 is driven by the driving unit to connect with the first tuning branch T1 to acquire the first identifier T1. The second identifier acquisition unit 221 is configured to find a second identifier T6 corresponding to the first identifier T1 based on a predefined correspondence relation. The switch control unit 222 is configured to transmit a specific driving signal to the driving unit for the second switch 122, so that the driving unit drives the second switch 122 to connect with the tuning branch T6 corresponding to the second identifier T6. In this case, operating resonance frequencies of the first antenna portion and the second antenna portion are 0.7 GHz-0.746 GHz, the difference between the operating resonance frequencies satisfies the defined threshold, and the antenna energy is more uniformly distributed between the first antenna portion and the second antenna portion. Left and right head-hand performances of the antenna are balanced. The specific embodiments described above are only for describing the technical solutions of the embodiments of the present disclosure in more detail, and the embodiments of the present disclosure are not limited to the embodiments described above, and are not limited thereto.

Figure 4:
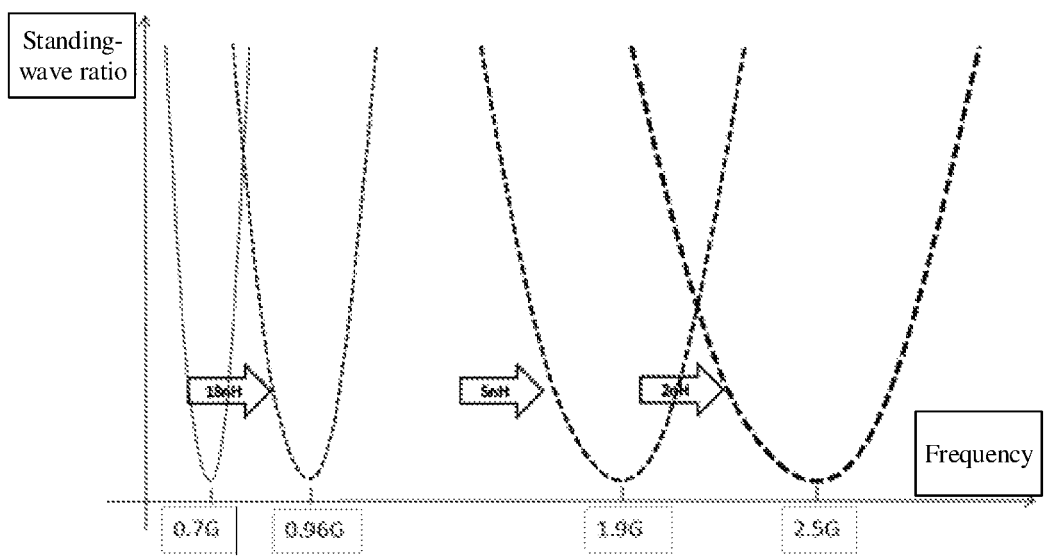
FIG. 4 is a schematic diagram of tuning a first antenna in an antenna control system in some embodiments of the present disclosure.

Referring to FIG. 4, FIG. 4 shows a schematic diagram of tuning a first antenna in some embodiments of the present disclosure. In the embodiments of the present disclosure, for example, the length of the first antenna 111 is 50 mm, and is applied to an all-metal slot appearance model, that is, a model of mobile terminal having at least two metal cover plates provided with a slot between the two metal cover plates. 0.7 G, 0.96 G, 1.9 G and 2.5 G have a unit of Hz and are central frequencies of frequency bands of the operating resonance frequencies of the first antenna portion 11 in cases that the first switch 112 of the first antenna portion 11 is connected to the four tuning branches of the first multi-tuning circuit 113. From left to right, a first solid curve represents a schematic diagram of a correspondence between an operating resonance frequency of the tuning branch of 82 nH and a standing-wave ratio. As may be seen, the standing-wave ratio is the smallest at 0.7 GHz, that is, a radiation performance is the best at this frequency. Correspondingly, three dashed curves from left to right correspond to tuning branches of 18 nH, 5 nH, 2 nH, respectively.

Referring to Table 1, measured active data of an anechoic chamber for an antenna is shown, antenna radiation performance of a conventional IFA antenna is compared with that of a dual-resonance-arm antenna in some optional embodiments of the present disclosure. A Total Radiated Power (TRP) is used as a performance indicator in dbm (decibel milliX, which may be a decibel millivolt or a decibel milliwatt). A power integral may be evaluated with respect to an entire surface of a radiating sphere of a tested antenna, and the power integral is averaged relative to an area of the entire surface of the radiating sphere to obtain the TRP. The TRP may reflect an overall transmission power of the mobile terminal using the tested antenna. A Beside Head and Hand at Right side (BHHR) represents a right head-hand model, i.e. a model in which the mobile terminal including the antenna system is held by a right hand and positioned at a right side of a head; correspondingly, a Beside Head and Hand at Right side (BHHL) represents a left head-hand model, i.e. a model in which the mobile terminal including the antenna system is held by a left hand and positioned at a left side of the head. Wherein, a Global System for Mobile Communication (GSM) 900, GSM 1800, Long Term Evolution (LTE) B40 and LTE B41 are different frequency bands for different systems, for example, GSM900 is a 900 frequency band for a GSM system, i.e., an uplink frequency is 880 MHz-915 MHz, and a downlink frequency is 925 MHz-960 MHz. Obviously, as may be seen from Table 1, the difference between the total radiated power in case of the BHHR and the total radiated power in case of the BHHL according to the dual-resonance-arm antenna in the embodiments of the present disclosure is significantly smaller than the difference between the total radiated power in case of BHHR and the total radiated power in case of BHHL according to the conventional IFA antenna, i.e., performances of the left head-hand model and the right head-hand model are more balanced.

TABLE 1

| | GSM900 TRP | GSM1800 TRP | LTE B40 TRP | LTE B41 TRP |
| --- | --- | --- | --- | --- |
| Conventional IFA antenna: BHHR/BHHL | 18/8 dbm | 21/6 dbm | 14/5 dbm | 13/5 dbm |
| Dual-resonance-arm antenna: BHHR/BHHL | 17/15 dbm | 19/17 dbm | 13/11 dbm | 12/12 dbm |

In an optional embodiment of the present disclosure, each of the tuning branches is an open circuit or is composed of an inductive element and/or a capacitive element arranged in series/in parallel. Simply, in practical applications, each of the tuning branches may be an open circuit, may be a grounded inductive element, may be a grounded capacitive element, and so on.

Referring to FIG. 3, in an optional embodiment of the present disclosure, a distance between a first connection point A and an open end of the first antenna 111, i.e., an end of an extension portion of the first antenna 111 away from the feed line 3, is less than or equal to $$\frac{c}{4fm1}.$$

The first connection point A is a connection point at which the first switch 112 is connected to the first antenna 111. A distance between a second connection point B and an open end of the second antenna 121, i.e., an end of an extension portion of the second antenna 121 away from the feed line 3, is less than or equal to $$\frac{c}{4fm2}.$$

The second connection point B is a connection point at which the second switch 122 is connected to the second antenna 121. The 'c' is a wave velocity of an electromagnetic wave when propagating in air, the fm1 is a maximum operating resonance frequency of the first antenna portion 11, and the fm2 is a maximum operating resonance frequency of the second antenna portion 12. It has been found in practice that, for example for the above-described first antenna portion 11, if the distance between the first connection point A and the open end of the above-described first antenna 111 is greater than $$\frac{c}{4fm1},$$

the actual operating resonance frequency of the first antenna portion 11 cannot reach the maximum operating resonance frequency fm1, and is limited by the distance between the first connection point A and the open end of the first antenna 111. It will be appreciated that the above description applies equally to the second antenna portion 12.

In an optional embodiment of that present disclosure, the difference between the length of the first antenna 111 and the length of the second antenna 121 is less than a defined difference value, i.e., the difference between the length of the first antenna 111 and the length of the second antenna 121 cannot be too large, for example, a ratio of the length of the first antenna 111 to the length of the second antenna 121 is less than 2:1 and greater than 1:2, because if the length of the first antenna 111 and the length of the second antenna 121 described above differ greatly, then when the operating resonance frequency of the first antenna portion 11 is in a high frequency band and the operating resonance frequency of the second antenna portion 12 is also in the high frequency band, the operating resonance frequency of the first antenna portion 11 is close to the operating resonance frequency of the second antenna portion 12, the antenna energy will be slightly biased toward the antenna portion having the higher operating resonance frequency, but the bias is not obvious, i.e., the left and right head-hand performances are more balanced. However, in a case that the operating resonance frequency of the first antenna portion 11 is in a low frequency band and the operating resonance frequency of the second antenna portion 12 is also in the low frequency band, i.e., the operating resonance frequency of the first antenna portion 11 is close to the operating resonance frequency of the second antenna portion 12, the antenna energy will be significantly biased toward the antenna portion having the higher operating resonance frequency, i.e., to one of the two sides, causing that the left and right head-hand performances are not balanced and an equalization effect is poor.

In summary, in some embodiments of the present disclosure, the antenna energy is more uniformly distributed at both sides of the antenna by enabling the symmetrically distributed first antenna portion and the second antenna portion to simultaneously operate and have operating resonance frequencies close to or equal to each other, without needing the switching between the left and right antennas according to an actual usage scene of the mobile terminal, thereby avoiding the problem that the switching between left and right antennas of the mobile terminal for purpose of improving the left and right head-hand performances of an antenna of the mobile terminal is insensitive or poorly adapted to different usage scenes, and a technical effect of balancing the left and right head-hand performances of the antenna is achieved. At the same time, by using a switch to switch to different tuning branches, the operating resonance frequency of the first antenna portion or the operating resonance frequency of the second antenna portion may be effectively changed, thereby realizing a wide-band coverage. The first antenna portion or the second antenna portion may be automatically adjusted according to the predefined correspondence relation, so that the balance of the left and right head-hand performances of the antenna may be automatically ensured when the operating resonance frequencies are changed.

Because in some optional embodiments of the present disclosure, the tuning branches may be composed of different circuit elements, the operable operating resonance frequency of the antenna portion corresponding to each tuning branch may be adjusted.

Because the distance between the switch and the open end of the corresponding antenna is defined in some optional embodiments of the present disclosure, the corresponding antenna portion may operate at the maximum operating resonance frequency, thereby avoiding a control defect from being generated.

Because the lengths of the first antenna and the second antenna are defined in some optional embodiments of the present disclosure, problems such as large difference in left and right head-hand performances at low frequencies and poor equalization effect are avoided.

Figure 5:
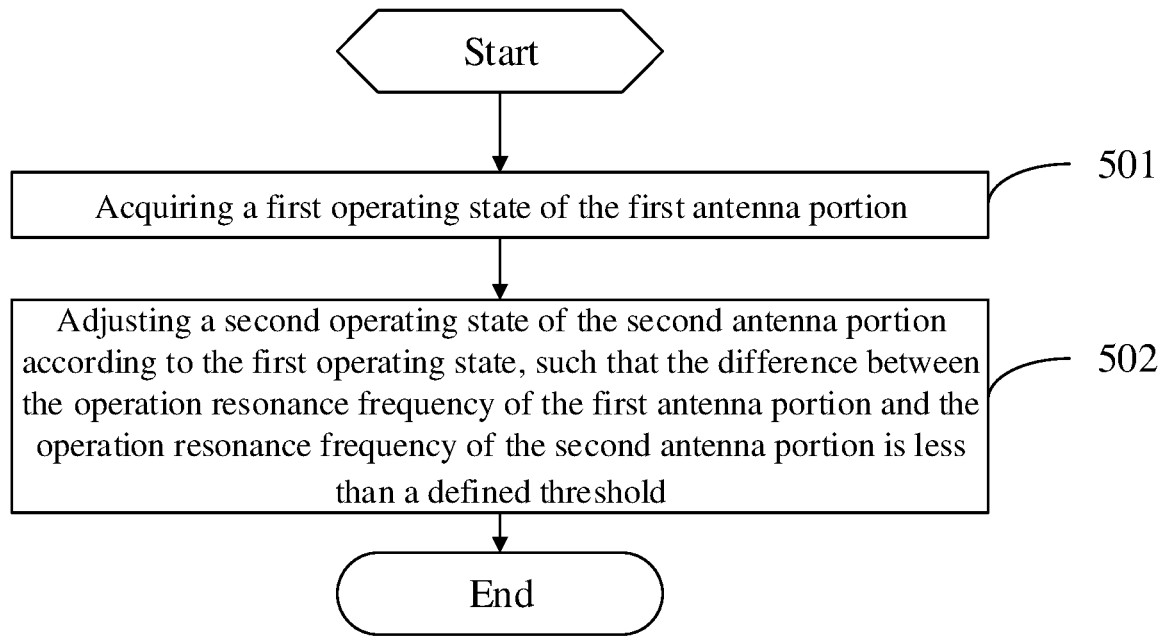
FIG. 5 is a flowchart of steps of an antenna control method in some embodiments of the present disclosure.

Referring to FIG. 5, FIG. 5 shows a flow chart of steps of an antenna control method in some embodiments of the present disclosure, wherein the antenna may specifically include a first antenna portion and a second antenna portion symmetrically distributed. Each of the first antenna portion and the second antenna portion have a plurality of operating states corresponding to a plurality of operating resonance frequencies. The method described above may specifically include steps 501-502.

Step 501: acquiring a first operating state of the first antenna portion.

Step 502: adjusting a second operating state of the second antenna portion according to the first operating state, such that the difference between the operation resonance frequency of the first antenna portion and the operation resonance frequency of the second antenna portion is less than a defined threshold.

The description of the above steps 501-502 may be obtained by referring to the description in the above embodiments, and is not repeated here.

In summary, in the embodiments of the present disclosure, the antenna energy is more uniformly distributed at both sides of the antenna by enabling the symmetrically distributed first antenna portion and the second antenna portion to simultaneously operate and have operating resonance frequencies close to or equal to each other, without needing the switching between the left and right antenna portions according to an actual usage scene of the mobile terminal, thereby avoiding the problem that the switching between left and right antenna portions of the mobile terminal for purpose of improving the left and right head-hand performances of an antenna of the mobile terminal is insensitive or poorly adapted to different usage scenes, and the technical effect of balancing the left and right head-hand performances of the antenna is achieved.

Figure 6:
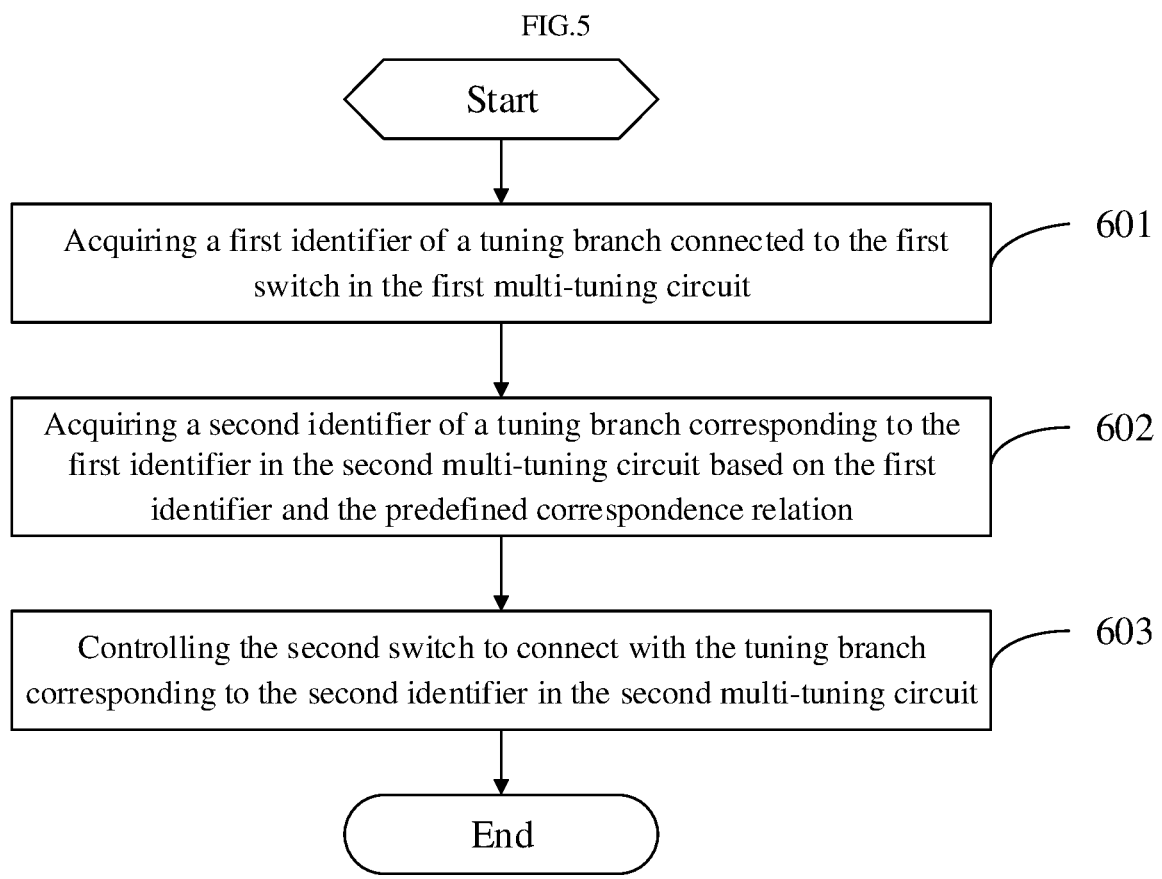
FIG. 6 is a flowchart of steps of an antenna control method in some embodiments of the present disclosure.

Referring to FIG. 6, some embodiments of the present disclosure provide an antenna control method, wherein the antenna may specifically include a first antenna portion and a second antenna portion symmetrically distributed; each of the first antenna portion and the second antenna portion has a plurality of operating states corresponding to a plurality of operating resonance frequencies; the first antenna portion is composed of a first antenna, a first switch, a first multi-tuning circuit connected in series; the second antenna portion is composed of a second antenna, a second switch, a second multi-tuning circuit connected in series; each of the first multi-tuning circuit and the second multi-tuning circuit is composed of multiple tuning branches arranged in parallel; predefined correspondence relations exist between the multiple tuning branches of the first multi-tuning circuit and the multiple tuning branches of the second multi-tuning circuit; in a case that one tuning branch of the multiple tuning branches of the first multi-tuning circuit is connected to the first switch, and a tuning branch in the second multi-tuning circuit having a predefined correspondence relation with the one tuning branch is connected to the second switch, difference between the operating resonance frequency of the first antenna portion and the operating resonance frequency of the second antenna portion is smaller than a defined threshold. The antenna control method may specifically include steps 601-603.

Step 601: acquiring a first identifier of a tuning branch connected to the first switch in the first multi-tuning circuit.

Step 602: acquiring a second identifier of a tuning branch in the second multi-tuning circuit corresponding to the first identifier based on the first identifier and the predefined correspondence relation.

Step 603: controlling the second switch to connect with the tuning branch corresponding to the second identifier in the second multi-tuning circuit.

The step 601 is an optional implementation of the step 501. The above steps 602 and 603 are optional implementations of the above step 502. Description of the above steps 601-603 may be obtained by referring to the description in the above embodiments, and is not repeated here.

In summary, in some embodiments of the present disclosure, the antenna energy is more uniformly distributed at both sides of the antenna by enabling the symmetrically distributed first antenna portion and the second antenna portion to simultaneously operate and have operating resonance frequencies close to or equal to each other, without needing the switching between the left and right antennas according to an actual usage scene of the mobile terminal, thereby avoiding the problem that the switching between left and right antennas of the mobile terminal for purpose of improving the left and right head-hand performances of an antenna of the mobile terminal is insensitive or poorly adapted to different usage scenes, and a technical effect of balancing the left and right head-hand performances of the antenna is achieved. At the same time, by using a switch to switch to different tuning branches, the operating resonance frequency of the first antenna portion or the operating resonance frequency of the second antenna portion may be effectively changed, thereby realizing a wide-band coverage. The first antenna portion or the second antenna portion may be automatically adjusted according to the predefined correspondence relation, so that the balance of the left and right head-hand performances of the antenna may be automatically ensured when the operating resonance frequencies are changed.

It should be noted that for simplicity of description, the method embodiment are all expressed as a series of actions, but those skilled in the art will appreciate that the embodiments of the present disclosure are not limited by an order of the series of actions described above, because certain steps may be performed in a different order or simultaneously in accordance with the embodiments of that present disclosure. Secondly, it should also be appreciated by those skilled in the art that the embodiments described in the specification are optional embodiments and that the actions involved are not necessarily indispensable for the embodiments of the present disclosure. Since the method embodiments are substantially similar to the apparatus embodiments, the description of the method embodiments is simple, and description of the method embodiments may be obtained by referring to a part of the description of the apparatus embodiment.

Figure 7:
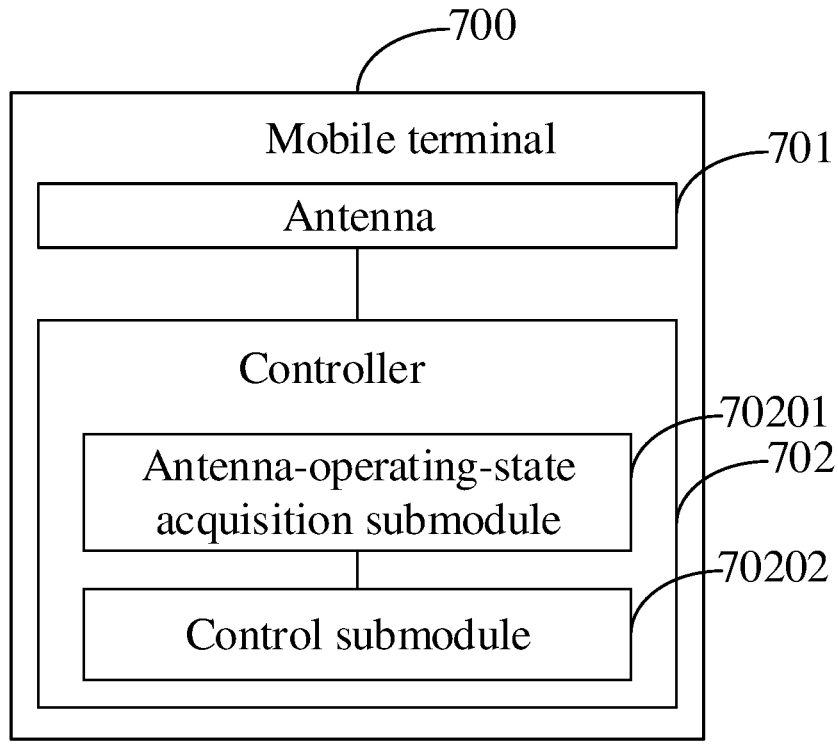
FIG. 7 is a block diagram of a mobile terminal in some embodiments of the present disclosure.

FIG. 7 is a block diagram of a mobile terminal of some embodiments of the present disclosure. The mobile terminal 700 shown in FIG. 7 may specifically include an antenna 701 and a controller 702. The antenna 701 may specifically include a first antenna portion and a second antenna portion symmetrically distributed. Each of the first antenna portion and the second antenna portion has a plurality of operating states corresponding to a plurality of operating resonance frequencies. The controller 702 may specifically include an antenna-operating-state acquisition submodule 70201 and a control submodule 70202. The antenna-operating-state acquisition submodule 70201 is configured to acquire a first operating state of the first antenna portion. The control submodule 70202 is configured to adjust a second operating state of the second antenna portion based on the first operating state, such that difference between an operating resonance frequency of the first antenna portion and an operating resonance frequency of the second antenna portion is less than a defined threshold.

In some optional embodiments, the first antenna portion includes a first antenna, a first switch, and a first multi-tuning circuit connected in series; the second antenna portion includes a second antenna, a second switch and a second multi-tuning circuit connected in series. Each of the first multi-tuning circuit and the second multi-tuning circuit includes multiple tuning branches arranged in parallel. Predefined correspondence relations exist between the multiple tuning branches of the first multi-tuning circuit and the multiple tuning branches of the second multi-tuning circuit. When one tuning branch of the first multi-tuning circuit is connected with the first switch, and a tuning branch of the second multi-tuning circuit having the predefined correspondence relation is connected with the second switch, the difference between the operating resonance frequency of the first antenna portion and the operating resonance frequency of the second antenna portion is less than a defined threshold.

In some optional embodiments, the antenna-operating-state acquisition submodule 70201 may include a first identifier acquisition unit configured to acquire a first identifier of a tuning branch connected with the first switch in the first multi-tuning circuit. The control submodule 70202 may include a second identifier acquisition unit configured to acquire a second identifier of a tuning branch corresponding to the first identifier in the second multi-tuning circuit based on the first identifier and the predefined correspondence relation; and a switch control unit configured to control the second switch to connect with the tuning branch corresponding to the second identifier in the second multi-tuning circuit.

The mobile terminal 700 may implement each step implemented by the mobile terminal in the method embodiments of FIG. 5 to FIG. 6. In order to avoid repetition, detailed description thereof is omitted here.

In summary, in the embodiments of the present disclosure, the antenna energy is more uniformly distributed at both sides of the antenna by enabling the symmetrically distributed first antenna portion and the second antenna portion to simultaneously operate and have operating resonance frequencies close to or equal to each other, without needing the switching between the left and right antenna portions according to an actual usage scene of the mobile terminal, thereby avoiding the problem that the switching between left and right antenna portions of the mobile terminal for purpose of improving the left and right head-hand performances of an antenna of the mobile terminal is insensitive or poorly adapted to different usage scenes, and the technical effect of balancing the left and right head-hand performances of the antenna is achieved.

Because, in an optional embodiment of the present disclosure, different tuning branches may be switched by using a switch, the operating resonance frequency of the first antenna portion or the operating resonance frequency of the second antenna portion may be effectively changed, thereby realizing a wide-band coverage. The first antenna portion or the second antenna portion may be automatically adjusted according to the predefined correspondence relation, so that the balance of the left and right head-hand performances of the antenna may be automatically ensured when the operating resonance frequencies are changed.

Figure 8:
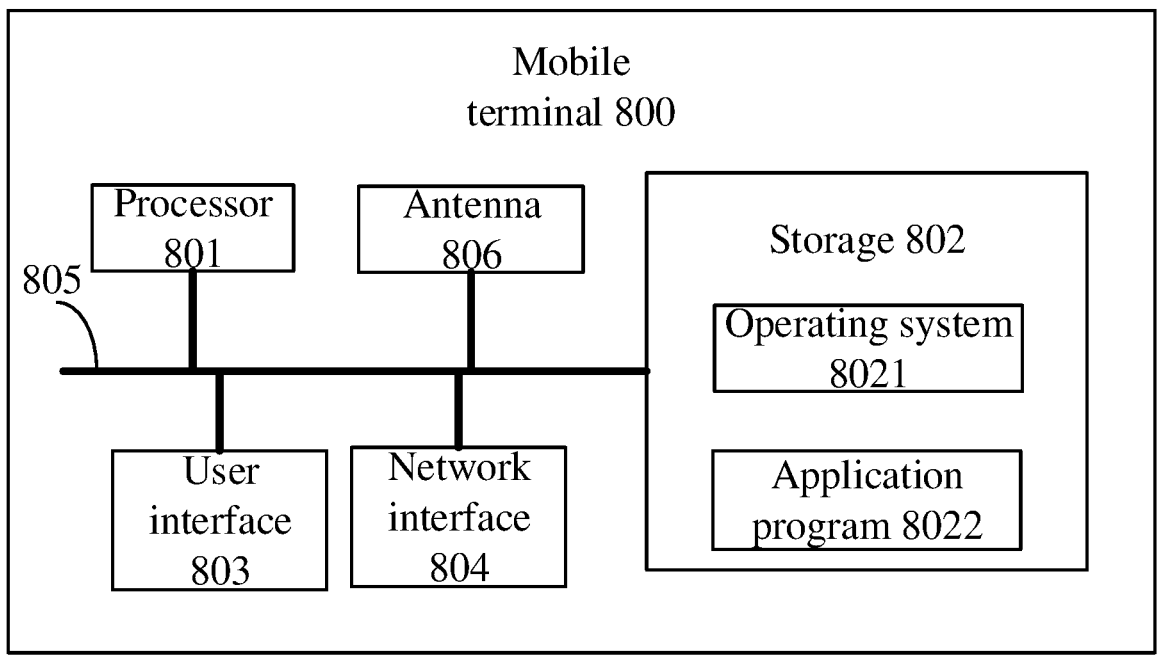
FIG. 8 is a block diagram of a mobile terminal in some embodiments of the present disclosure.

FIG. 8 is a block diagram of a mobile terminal in some other embodiments of the present disclosure. The mobile terminal 800 shown in FIG. 8 includes at least one processor 801, a storage 802, at least one network interface 804, another user interface 803, and an antenna 806. Various components in the mobile terminal 800 are coupled together by a bus system 805. It will be appreciated that the bus system 805 is used to enable connection and communication between these components. The bus system 805 includes, besides a data bus, a power bus, a control bus, and a status signal bus. However, for clarity of illustration, various buses are designated as the bus system 805 in FIG. 8.

The user interface 803 may include a display, a keyboard, or a pointing device (e.g., a mouse, a trackball, a touch pad, or a touch screen, etc.).

The antenna 806 may include a first antenna portion and a second antenna portion symmetrically distributed. Each of the first antenna portion and the second antenna portion has a plurality of operating states corresponding to a plurality of operating resonance frequencies.

It will be appreciated that the storage 802 in embodiments of the present disclosure may be a volatile storage or a non-volatile storage, or may include both the volatile storage and the non-volatile storage. The nonvolatile storage may be a Read-Only Memory (ROM), a Programmable ROM (PROM), an Erasable Programmable Read-Only Memory (EPROM), an Electrically Erasable Programmable Read-Only Memory (EEPROM), or a flash memory. The volatile memory may be a Random Access Memory (RAM), which serves as an external cache. By way of example, but not limitation, many forms of RAMs may be used, such as a Static Random Access Memory (SRAM), a Dynamic Random Access Memory (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 802 in the systems and methods described by embodiments of the present disclosure is intended to include, but is not limited to, these and any other suitable types of storages.

In some embodiments, the storage 802 stores following elements, executable modules or data structures, or a subset thereof, or an extended set thereof: an operating system 8021 and an application program 8022.

The operating system 8021 includes various system programs, such as a framework layer, a core library layer, and a driver layer, used for implementing various basic services and processing hardware-based tasks. The application program 8022 includes various application programs such as a Media Player, a Browser, and the like, and is used to implement various application services. Programs for implementing the methods of embodiments of the present disclosure may be included in the application program 8022.

In the embodiments of that present disclosure, by invoking a program or instructions stored in storage 802, in particular, a program or instructions stored in the application program 8022, the processor 801 is configured to acquire a first operating state of the first antenna portion; adjust a second operating state of the second antenna portion based on the first operating state such that difference between an operating resonance frequency of the first antenna portion and an operating resonance frequency of the second antenna portion is less than a defined threshold.

The method disclosed by the embodiments of the present disclosure described above may be applied to, or implemented by, the processor 801. The processor 801 may be an integrated circuit chip with signal processing capability. In implementation, steps of the method described above may be accomplished by an integrated logic circuitry of hardware in the processor 801 or instructions in a form of software. The processor 801 may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. The disclosed methods, steps, and logic blocks in embodiments of the present disclosure may be implemented or performed. The general purpose processor may be a microprocessor or the processor may be any conventional processor or the like. The steps of the method disclosed in connection with embodiments of the present disclosure may be implemented directly as being performed by a hardware decoding processor, or as be performed by a combination of hardware and software modules in the decoding processor. The software module may be in a storage medium mature in the art such as the random access memory, the flash memory, the read only memory, the programmable read only memory, or the electrically erasable programmable memory, the registers, etc. The storage medium is in the storage 802. The processor 801 reads information in the storage 802 and performs the steps of the method described above in conjunction with its hardware.

It will be appreciated that the embodiments described herein may be implemented in hardware, software, firmware, middleware, a microcode, or a combination thereof. For a hardware implementation, a processing unit may be implemented in one or more Application Specific Integrated Circuits (ASICs), a Digital Signal Processor (DSP), a Digital Signal Processing Device (DSPD), a Programmable Logic Device (PLD), a Field-Programmable Gate Array (FPGA), a general purpose processor, a controller, a microcontroller, a microprocessor, other electronic units for performing functions described herein, or a combination thereof.

For a software implementation, techniques described in embodiments of the present disclosure may be implemented by modules (e.g., processes, functions, etc.) that perform the functions described in the embodiments of the disclosure. The software code may be stored in the storage and executed by a processor. The storage may be implemented in the processor or external to the processor.

In some optional embodiments, the first antenna portion of the first antenna 806 includes a first antenna, a first switch, and a first multi-tuning circuit connected in series; the second antenna portion of the first antenna 806 includes a second antenna, a second switch and a second multi-tuning circuit connected in series. Each of the first multi-tuning circuit and the second multi-tuning circuit includes multiple tuning branches arranged in parallel. Predefined correspondence relations exist between the multiple tuning branches of the first multi-tuning circuit and the multiple tuning branches of the second multi-tuning circuit. In a case that any tuning branch of the first multi-tuning circuit is connected with the first switch, and a tuning branch having a predefined correspondence relation in the second multi-tuning circuit is connected with the second switch, the difference between the operating resonance frequency of the first antenna portion and the operating resonance frequency of the second antenna portion is less than a defined threshold.

In some optional embodiments, the processor 801 is configured to acquire a first identifier of the tuning branch connected with the first switch in the first multi-tuning circuit; acquire a second identifier of a tuning branch corresponding to the first identifier in the second multi-tuning circuit based on the first identifier and the predefined correspondence relation stored in the storage 802; and control the second switch to connect with the tuning branch corresponding to the second identifier in the second multi-tuning circuit.

In some optional embodiments, each of the tuning branches is an open circuit, or is composed of an inductive element and/or a capacitive element connected in series/in parallel.

In some optional embodiments, a distance between a first connection point and an open end of the first antenna is less than or equal to $$\frac{c}{4fm1}.$$

The first connection point is a connection point at which the first switch is connected to the first antenna. A distance between a second connection point and an open end of the second antenna is less than or equal to $$\frac{c}{4fm2}.$$

The second connection point is a connection point at which the second switch is connected to the second antenna. The 'c' is a wave velocity of an electromagnetic wave when propagating in air, the fm1 is a maximum operating resonance frequency of the first antenna portion, and the fm2 is a maximum operating resonance frequency of the second antenna portion.

In some optional embodiments, difference between the length of the first antenna and the length of the second antenna is less than a defined difference value.

The mobile terminal 800 may implement various steps implemented by the mobile terminal in the foregoing embodiments, and will not be described again here in order to avoid repetition.

In summary, in some embodiments of the present disclosure, the antenna energy is more uniformly distributed at both sides of the antenna by enabling the symmetrically distributed first antenna portion and the second antenna portion to simultaneously operate and have operating resonance frequencies close to or equal to each other, without needing the switching between the left and right antennas according to an actual usage scene of the mobile terminal, thereby avoiding the problem that the switching between left and right antennas of the mobile terminal for purpose of improving the left and right head-hand performances of an antenna of the mobile terminal is insensitive or poorly adapted to different usage scenes, and a technical effect of balancing the left and right head-hand performances of the antenna is achieved.

Because, in an optional embodiment of the present disclosure, different tuning branches may be switched by using a switch, the operating resonance frequency of the first antenna portion or the operating resonance frequency of the second antenna portion may be effectively changed, thereby realizing a wide-band coverage. The first antenna portion or the second antenna portion may be automatically adjusted according to the predefined correspondence relation, so that the balance of the left and right head-hand performances of the antenna may be automatically ensured when the operating resonance frequencies are changed.

Because in some optional embodiments of the present disclosure, the tuning branches may be composed of different circuit elements, the operable operating resonance frequency of the antenna portion corresponding to each tuning branch may be adjusted.

Because the distance between the switch and the open end of the corresponding antenna is defined in some optional embodiments of the present disclosure, the corresponding antenna portion may operate at the maximum operating resonance frequency, thereby avoiding a control defect from being generated.

Because the lengths of the first antenna and the second antenna are defined in some optional embodiments of the present disclosure, problems such as large difference in left and right head-hand performances at low frequencies and poor equalization effect are avoided.

Figure 9:
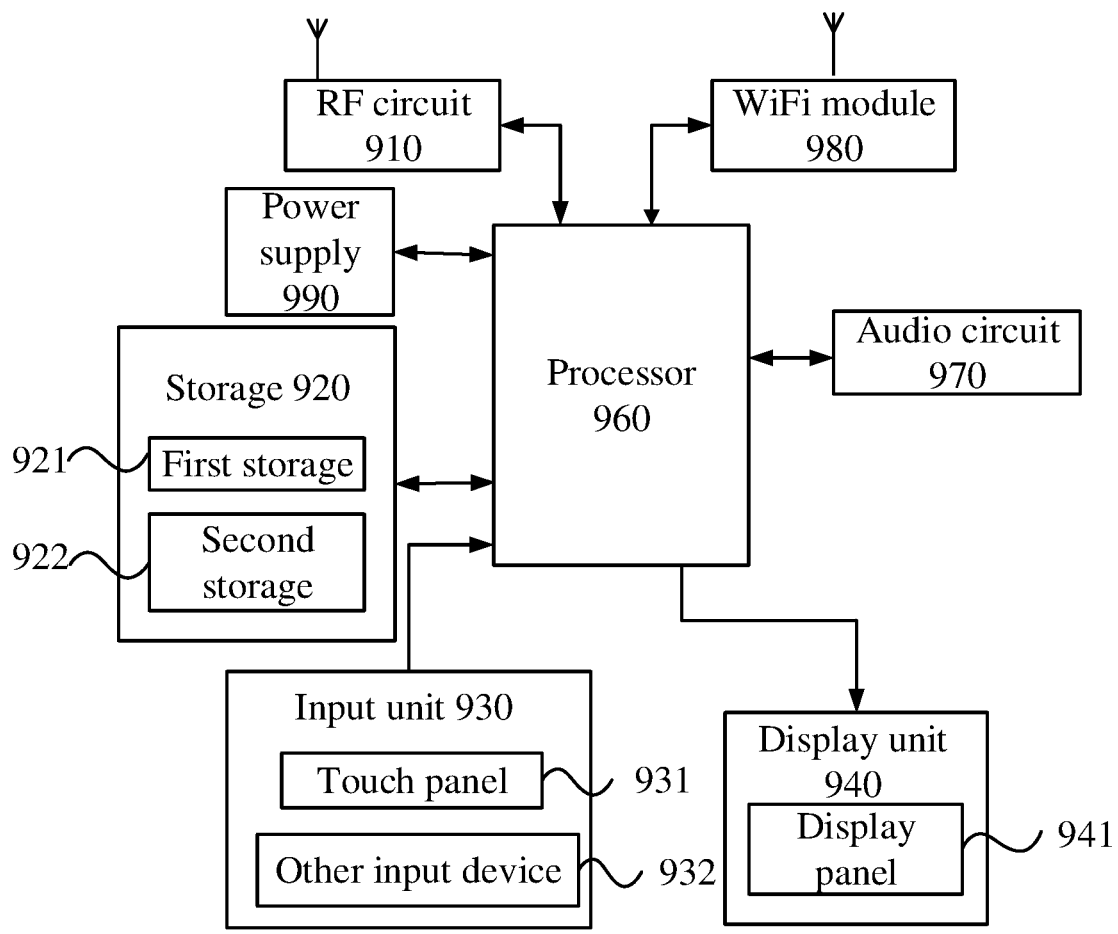
FIG. 9 is a schematic structural diagram of a mobile terminal in some embodiments of the present disclosure.

FIG. 9 is a schematic structural diagram of a mobile terminal according to another embodiment of the present disclosure. Specifically, the mobile terminal 900 in FIG. 9 may be a mobile phone, a tablet computer, a Personal Digital Assistant (PDA), an in-vehicle computer, or the like.

The mobile terminal 900 in FIG. 9 includes a Radio Frequency (RF) circuit 910, a storage 920, an input unit 930, a display unit 940, a processor 960, an audio circuit 970, a Wireless Fidelity (WiFi) module 980 and a power supply 990.

Wherein, the input unit 930 may be configured to receive digital or character information inputted by a user and generate a signal input related to user settings and function control of the mobile terminal 900. Specifically, in the embodiments of the present disclosure, the input unit 930 may include a touch panel 931. The touch panel 931, also referred to as a touch screen, may collect user touch operations on or near the touch panel 931 (such as user operations on the touch panel 931 by the user using any suitable object or accessory such as a finger, a stylus, etc.), and drive a corresponding connecting device according to a program provided in advance. In some optional embodiments, the touch panel 931 may include two parts, a touch detection device and a touch controller. Wherein the touch detection device detects a touch orientation of the user, detects a signal caused by a touch operation, and transmits the signal to the touch controller. The touch controller receives touch information from the touch detection device, converts the touch information into contact coordinates, transmits the contact coordinates to the processor 960, and may receive and execute commands from the processor 960. In addition, the touch panel 931 may be implemented as various types such as a resistive type, a capacitive type, an infrared ray type, and a surface acoustic wave type. Besides the touch panel 931, the input unit 930 may include another input device 932 that may include, but is not limited to, one or more of a physical keyboard, a function key (such as volume control keys, switch keys, etc.), a trackball, a mouse, joystick, or the like.

The display unit 940 may be configured to display information inputted by the user or information provided to the user and various menu interfaces of the mobile terminal 900. The display unit 940 may include a display panel 941, which in some optional embodiments may employ an LCD or an Organic Light-Emitting Diode (OLED) or the like to configure the display panel 941.

It should be noted that the touch panel 931 may cover the display panel 941 to form a touch display screen. Upon detection of a touch operation thereon or in the vicinity thereof by the touch display screen, the touch operation is transmitted to the processor 960 to determine a type of a touch event. The processor 960 then provides a corresponding visual output on the touch display screen according to the type of the touch event.

The touch display screen includes an application interface display area and a common control display area. An arrangement mode of the application interface display area and the common control display area is not limited, and may be an up-down arrangement or a left-right arrangement in which two display areas may be distinguished. The application interface display area may be used to display an interface of an application. Each of the interfaces may contain interface elements such as an icon of at least one application and/or a widget desktop control. The application interface display area may also be an empty interface that does not contain any content. The common control display area is used to display control with high utilization rate, such as application icon such as a setting button, an interface number, a scroll bar, a phone book icon and so on.

The processor 960 is a control center of the mobile terminal 900, connects various parts of the entirety of the mobile terminal by using various interfaces and lines, and by running or executing software programs and/or modules stored in a first storage 921 and invoking data stored in a second storage 922, performs various functions and processes data of the mobile terminal 900, thereby performing an overall monitoring of the mobile terminal 900. In some optional embodiments, the processor 960 may include one or more processing units.

The radio frequency circuit 910 may include at least an antenna, and the antenna may specifically include a first antenna portion and a second antenna portion symmetrically distributed. Each of the first antenna portion and the second antenna portion has a plurality of operating states corresponding to a plurality of operating resonance frequencies.

In some embodiments of that present disclosure, the processor 960 is operable to: by invoking a software program and/or a module stored within the first storage 921 and/or data within the second storage 922, acquire a first operate state of the first antenna portion, adjust a second operating state of the second antenna portion based on the first operating state such that a difference between an operating resonance frequency of the first antenna portion and an operating resonance frequency of the second antenna portion is less than a defined threshold.

In some optional embodiments, the first antenna portion in the antenna 906 includes a first antenna, a first switch, and a first multi-tuning circuit connected in series; the second antenna portion in the antenna 906 includes a second antenna, a second switch and a second multi-tuning circuit connected in series. Each of the first multi-tuning circuit and the second multi-tuning circuit includes multiple tuning branches arranged in parallel. Predefined correspondence relations exist between the multiple tuning branches of the first multi-tuning circuit and the multiple tuning branches of the second multi-tuning circuit. When one tuning branch of the first multi-tuning circuit is connected with the first switch, and a tuning branch of the second multi-tuning circuit having the predefined correspondence relation is connected with the second switch, the difference between the operating resonance frequency of the first antenna portion and the operating resonance frequency of the second antenna portion is less than a defined threshold.

In some optional embodiments, the processor 960 is configured to acquire a first identifier of the tuning branch connected with the first switch in the first multi-tuning circuit; acquire a second identifier of a tuning branch corresponding to the first identifier in the second multi-tuning circuit based on the first identifier and the predefined correspondence relation stored in the storage 920; and control the second switch to connect with the tuning branch corresponding to the second identifier in the second multi-tuning circuit.

In some optional embodiments, each of the tuning branches is an open circuit, or is composed of an inductive element and/or a capacitive element connected in series/in parallel.

In some optional embodiments, a distance between a first connection point and an open end of the first antenna is less than or equal to $$\frac{c}{4fm1}.$$

The first connection point is a connection point at which the first switch is connected to the first antenna. A distance between a second connection point and an open end of the second antenna is less than or equal to $$\frac{c}{4fm2}.$$

The second connection point is a connection point at which the second switch is connected to the second antenna. The 'c' is a wave velocity of an electromagnetic wave when propagating in air, the fm1 is a maximum operating resonance frequency of the first antenna portion, and the fm2 is a maximum operating resonance frequency of the second antenna portion.

In some optional embodiments, difference between the length of the first antenna and the length of the second antenna is less than a defined difference value.

In summary, in some embodiments of the present disclosure, the antenna energy is more uniformly distributed at both sides of the antenna by enabling the symmetrically distributed first antenna portion and the second antenna portion to simultaneously operate and have operating resonance frequencies close to or equal to each other, without needing the switching between the left and right antennas according to an actual usage scene of the mobile terminal, thereby avoiding the problem that the switching between left and right antennas of the mobile terminal for purpose of improving the left and right head-hand performances of an antenna of the mobile terminal is insensitive or poorly adapted to different usage scenes, and a technical effect of balancing the left and right head-hand performances of the antenna is achieved.

Because, in an optional embodiment of the present disclosure, different tuning branches may be switched by using a switch, the operating resonance frequency of the first antenna portion or the operating resonance frequency of the second antenna portion may be effectively changed, thereby realizing a wide-band coverage. The first antenna portion or the second antenna portion may be automatically adjusted according to the predefined correspondence relation, so that the balance of the left and right head-hand performances of the antenna may be automatically ensured when the operating resonance frequencies are changed.

Because in some optional embodiments of the present disclosure, the tuning branches may be composed of different circuit elements, the operable operating resonance frequency of the antenna portion corresponding to each tuning branch may be adjusted.

Because the distance between the switch and the open end of the corresponding antenna is defined in some optional embodiments of the present disclosure, the corresponding antenna portion may operate at the maximum operating resonance frequency, thereby avoiding a control defect from being generated.

Because the lengths of the first antenna and the second antenna are defined in some optional embodiments of the present disclosure, problems such as large difference in left and right head-hand performances at low frequencies and poor equalization effect are avoided.

Those of ordinary skill in the art will appreciate that elements and algorithm steps of examples described in connection with the embodiments disclosed herein may be implemented in electronic hardware, or a combination of computer software and electronic hardware. Whether functions are executed in hardware or are executed in software depends on specific applications and design constraints of the technical solution. One skilled in the art may use different methods to implement the described functions for each particular application, but such implementation should not be considered to go beyond the scope of the present disclosure.

Those skilled in the art may clearly understand that, for convenience and brevity of description, specific working processes of the above-described systems, devices and units may be obtained by referring to corresponding processes in the foregoing process embodiments, and will not be described in detail herein.

In the embodiments provided herein, it should be understood that the disclosed apparatus and methods may be implemented in other ways. For example, the product embodiments described above are merely illustrative, for example, a division to modules is only a logical functional division, and additional divisions may exist in actual conditions. For example, multiple elements or components may be combined or may be integrated into another system, or some features may be ignored or not performed. Optionally, a coupling or a direct coupling or a communication connection between modules or elements being shown or discussed may be an indirect coupling or a communication connection through some interfaces, devices or units, and the coupling or a direct coupling or a communication connection may be in an electrical, a mechanical or other form.

The elements described as separate elements may or may not be physically separated, and elements displayed as units may or may not be physical elements, i.e. may be located in one place or may be distributed over a plurality of network elements. Some or all of the units therein may be selected according to actual needs to achieve the purpose of the solution of the present disclosure.

In addition, functional units in the embodiments of that present disclosure may be integrated in one processing unit, may be physically exist separately from each other, or two or more of the functional units may be integrated in one unit.

The functions, if implemented in a form of software functional units and sold or used as separate products, may be stored in a computer readable storage medium. Based on this understanding, an essence of the technical solution of the present disclosure, or a part of the technical solution of the present disclosure contributing to the related art, or a part of the technical solution may be embodied in a form of a software product stored in a storage medium. The storage medium includes a number of instructions used to cause a computer device (which may be a personal computer, a server, or a network device, etc.) to perform all or parts of the steps of the method described in various embodiments of the present disclosure. The aforementioned storage medium includes various medium capable of storing program codes, such as a USB disk, a removable hard disk, a ROM, a RAM, a magnetic disk, or a compact disc.

It should also be noted that in this context, relational terms such as first and second, etc. are used only to distinguish one entity or operation from another entity or operation. Existence of any actual relation or order between these entities or operations is not necessarily required or implied. Moreover, a term "comprising," "comprise," or any other variant thereof is intended to cover a non-exclusive inclusion such that processes, methods, articles or terminal devices comprising a series of elements include not only those elements, but also other elements that are not explicitly listed, or that are inherent to such processes, methods, articles, or terminal devices. An element preceding a statement "including one, if without further limitation, does not exclude the presence of further identical elements in the element besides the process, method, article or terminal device.

What is described above are optional embodiments of the present disclosure, the protection scope of the present disclosure is not limited thereto. Those of ordinary skills in the art may easily think of various modifications or replacements within the scope of the present disclosure. These modifications or replacements are also included in the scope of the present disclosure. Thus, the protection scope of the present disclosure should be determined according to the scope of the claims.

What is claimed is:

1. An antenna control system, comprising:
   an antenna and a controller;
   wherein the antenna comprises a first antenna portion and a second antenna portion; each of the first antenna portion and the second antenna portion has a plurality of operating states corresponding to a plurality of operating resonance frequencies;
   the controller comprises an antenna-operating-state acquisition submodule and a control submodule, the antenna-operating-state acquisition submodule is configured to acquire a first operating state of the first antenna portion; the control submodule is configured to adjust a second operating state of the second antenna portion based on the first operating state such that a difference between an operating resonance frequency of the first antenna portion and an operating resonance frequency of the second antenna portion is less than a defined threshold.

2. The system according to claim 1, wherein the first antenna portion comprises a first antenna, a first switch, and a first multi-tuning circuit connected in series; the second antenna portion comprises a second antenna, a second switch, and a second multi-tuning circuit connected in series; each of the first multi-tuning circuit and the second multi-tuning circuit comprises multiple tuning branches arranged in parallel;
   a predefined correspondence relation exists between a tuning branch of the first multi-tuning circuit and a tuning branch of the second multi-tuning circuit; in a case that one tuning branch of the first multi-tuning circuit is connected with the first switch, and a tuning branch having the predefined correspondence relation in the second multi-tuning circuit is connected with the second switch, the difference between the operating resonance frequency of the first antenna portion and the operating resonance frequency of the second antenna portion is less than the defined threshold.

3. The system according to claim 2, wherein, the antenna-operating-state acquisition submodule comprises a first identifier acquisition unit configured to acquire a first identifier of a tuning branch connected with the first switch in the first multi-tuning circuit;

the control submodule comprises a second identifier acquisition unit and a switch control unit, the second identifier acquisition unit is configured to acquire a second identifier of a tuning branch corresponding to the first identifier in the second multi-tuning circuit based on the first identifier and the predefined correspondence relation, the switch control unit is configured to control the second switch to connect with the tuning branch corresponding to the second identifier in the second multi-tuning circuit.

4. The system according to claim 2, wherein each of the tuning branches is an open circuit or comprises an inductive element and/or a capacitive element connected in series or in parallel.

5. The system according to claim 2, wherein, a distance between a first connection point and an open end of the first antenna is less than or equal to $$\frac{c}{4fm1},$$

the first connection point is a connection point at which the first switch is connected to the first antenna;

a distance between a second connection point and an open end of the second antenna is less than or equal to $$\frac{c}{4fm2},$$

the second connection point is a connection point at which the second switch is connected to the second antenna;

the 'c' is a wave velocity of an electromagnetic wave when propagating in air, the fm1 is a maximum operating resonance frequency of the first antenna portion, and the fm2 is a maximum operating resonance frequency of the second antenna portion.

6. The system according to claim 2, wherein difference between a length of the first antenna and a length of the second antenna is smaller than a defined difference.

7. A method of controlling an antenna, the antenna comprising a first antenna portion and a second antenna portion, each of the first antenna portion and the second antenna portion having a plurality of operating states corresponding to a plurality of operating resonance frequencies, the method comprising:

acquiring a first operating state of the first antenna portion;

adjusting a second operating state of the second antenna portion based on the first operating state such that difference between an operating resonance frequency of the first antenna portion and an operating resonance frequency of the second antenna portion is less than a defined threshold.

8. The method according to claim 7, wherein the first antenna portion comprises a first antenna, a first switch, and a first multi-tuning circuit connected in series; the second antenna portion comprises a second antenna, a second switch, and a second multi-tuning circuit connected in series; each of the first multi-tuning circuit and the second multi-tuning circuit comprises multiple tuning branches arranged in parallel;

a predefined correspondence relation exists between a tuning branch of the first multi-tuning circuit and a tuning branch of the second multi-tuning circuit; in a case that one tuning branch of the first multi-tuning circuit is connected with the first switch, and a tuning branch having the predefined correspondence relation in the second multi-tuning circuit is connected with the second switch, the difference between the operating resonance frequency of the first antenna portion and the operating resonance frequency of the second antenna portion is less than the defined threshold.

9. The method according to claim 8, wherein, acquiring the first operating state of the first antenna portion comprises acquiring a first identifier of a tuning branch connected with the first switch in the first multi-tuning circuit;

adjusting the second operating state of the second antenna portion based on the first operating state such that difference between the operating resonance frequency of the first antenna portion and the operating resonance frequency of the second antenna portion is less than the defined threshold, comprises:

acquiring a second identifier of a tuning branch corresponding to the first identifier in the second multi-tuning circuit based on the first identifier and the predefined correspondence relation; and controlling the second switch to connect with the tuning branch corresponding to the second identifier in the second multi-tuning circuit.

10. A mobile terminal, comprising:
the antenna control system according to claim 1.

11. The system according to claim 1, wherein the first antenna portion and the second antenna portion are structures in a mobile terminal that are respectively located at a left side and a right side of the mobile terminal.

12. The method according to claim 7, wherein the first antenna portion and the second antenna portion are structures in a mobile terminal that are respectively located at a left side and a right side of the mobile terminal.

* * * * *